United States Patent
Ashikhmin et al.

(10) Patent No.: US 9,615,384 B2
(45) Date of Patent: Apr. 4, 2017

(54) PILOT ASSIGNMENT IN CELL FREE MASSIVE MIMO WIRELESS SYSTEMS

(71) Applicant: ALCATEL LUCENT, Boulogne-Billancourt (FR)

(72) Inventors: Alexei Ashikhmin, Morristown, NJ (US); Hien Quoc Ngo, New Providence, NJ (US); Thomas L. Marzetta, Summit, NJ (US); Hong Yang, Ledgewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 104 days.

(21) Appl. No.: 14/610,337

(22) Filed: Jan. 30, 2015

(65) Prior Publication Data

US 2016/0227577 A1    Aug. 4, 2016

(51) Int. Cl.
| | |
|---|---|
| H04W 74/00 | (2009.01) |
| H04L 5/00 | (2006.01) |
| H04L 27/26 | (2006.01) |
| H04B 7/04 | (2006.01) |
| H04W 72/12 | (2009.01) |
| H04B 7/0417 | (2017.01) |
| H04B 7/0452 | (2017.01) |

(52) U.S. Cl.
CPC ........ H04W 74/008 (2013.01); H04B 7/0417 (2013.01); H04B 7/0452 (2013.01); H04L 5/0048 (2013.01); H04L 27/2613 (2013.01); H04W 72/1226 (2013.01)

(58) Field of Classification Search
None
See application file for complete search history.

(56) References Cited

U.S. PATENT DOCUMENTS

2013/0070621 A1    3/2013  Marzetta et al.

OTHER PUBLICATIONS

International Search Report and Written Opinion mailed on May 10, 2016, in connection with International Patent Application No. PCT/US16/15570, 14 pgs.
Saxena, "Pilot Contamination and Mitigation Techniques in Massive MIMO Systems," Oct. 2014, retrieved from the Internet at: http://www.eit.lth.se/sprapport.php?uid=867, 71 pgs.
Li et al., "Spatial Orthogonality-Based Pilot Reuse for Multi-Cell Massive MIMO Transmission," IEEE International conference on Wireless Communications and Signal Processing, Oct. 24, 2013, pp. 1-6.
W. Liu et al., "Massive MIMO or small cell network: Who is more energy efficient?" in Proc. IEEE WCNC 2013 workshop on n Future Green End-to-End wireless Network, Shanghai, China, Apr. 2013, pp. 24-29.

(Continued)

*Primary Examiner* — Diane Lo
(74) *Attorney, Agent, or Firm* — Chiesa Shahinian & Giantomasi, PC (57) ABSTRACT

Systems and methods for assigning pilot sequences include randomly assigning pilot sequences to a population of access terminals. A first pilot sequence assigned to a worst performing access terminal of the population of access terminals is updated to a different pilot sequence that improves performance of the worst performing access terminal. A second pilot sequence assigned to a best performing access terminal of the population of access terminals is updated to another pilot sequence that reduces performance of the best performing access terminal.

20 Claims, 5 Drawing Sheets

(56) References Cited

OTHER PUBLICATIONS

E. G. Larsson et al., "Massive MIMO for Next Generation Wireless Systems," IEEE Commun. Mag., vol. 52, No. 2, pp. 186-195, Feb. 2014.
Z. Xiang et al., "Massive MIMO Multicasting in Noncooperative Cellular Networks," IEEE J. Sel. Areas Commun., vol. 32, No. 6, pp. 1180-1193, Jun. 2014.
J. Zhu et al., "Secure Transmission in Multicell Massive MIMO Systems," IEEE Trans. Wireless Commun., vol. 13, No. 9, pp. 4766-4781, Sep. 2014.
H. Yang et al., "A Macro Cellular Wireless Network with Uniformly High User Throughputs," in Proc. IEEE Veh. Technol. Conf.(VTC), Sep. 2014.
S. Zhou et al., "Distributed Wireless Communication System: A New Architecture for Future Public Wireless Access," IEEE Commun. Mag., vol. 41, No. 3, pp. 108-113, Mar. 2003.
K. T. Truong et al., "The Viability of Distributed Antennas for Massive MIMO Systems," in Proc. 45th Asilomar Conference on Signals, Systems and Computers (ACSSC '06), Pacific Grove, CA, USA, Nov. 2013, pp. 1318-1323.
Q. Sun et al., "On Scheduling for Massive Distributed MIMO Downlink," in Proc. IEEE Global Communications Conf. (GLOBECOM), GA, USA, Dec. 2013, pp. 4151-4156.
Z. Liu et al., "A comparative Study of Downlink MIMO Cellular Networks with Co-Located and Distributed Base-Station Antennas," IEEE Trans. Commun., Sep. 2014, submitted. [Online]. Available: http://arxiv.org/abs/1401.1203.

PILOT ASSIGNMENT IN CELL FREE MASSIVE MIMO WIRELESS SYSTEMS

BACKGROUND OF THE INVENTION

The present invention relates generally to wireless communication systems and more particularly to pilot sequence assignment in a cell free massive multiple-input multiple-output wireless system.

In a cell-free wireless communications system, access terminals are serviced by access points. In accordance with time division duplex (TDD) protocols, the access terminals synchronously and simultaneously transmit their pilot sequences to all access points. Each access point uses the pilot sequences to estimate channel coefficients between itself and each access terminal. High throughput in such a wireless communications system is achieved due to these estimated channel coefficients. The best estimates of channel coefficients can be obtained if the pilot sequences are orthogonal. Unfortunately, when the number of access terminals is large, the length of the pilot sequences must be increased to maintain orthogonality. However, the time required for long pilot sequences may be too long due to the limited length of the coherence interval. As such, short (and therefore non-orthogonal) pilot sequences are assigned to the access terminals. Current solutions for assigning non-orthogonal pilot sequences to access terminals result in a relatively low level of performance as compared to the ideal case when all pilot sequences are orthogonal.

BRIEF SUMMARY OF THE INVENTION

In accordance with one embodiment, systems and methods for assigning pilot sequences include assigning pilot sequences to a population of access terminals. A first pilot sequence assigned to a worst performing access terminal of the population of access terminals is updated to a different pilot sequence that improves performance of the worst performing access terminal. A second pilot sequence assigned to a best performing access terminal of the population of access terminals is updated to a different pilot sequence that reduces performance of the best performing access terminal.

In one embodiment, the step of updating the first pilot sequence assigned to the worst performing access terminal is performed iteratively until one or more criteria are satisfied. The one or more criteria may include performance of the worst performing access terminal improves by less than a threshold amount. In one embodiment, the step of updating the first pilot sequence assigned to the worst performing access terminal and the step of updating the second pilot sequence assigned to the best performing access terminal are performed iteratively until at least one of: performance of each of the population of access terminals is within a threshold performance amount of each other, and a predetermined number of iterations is satisfied.

In one embodiment, at least some of the pilot sequences are non-orthogonal.

In one embodiment, the performance of the population of access terminals is based on a signal-to-noise ratio of each of the population of access terminals.

In one embodiment, assigning pilot sequences to a population of access terminals includes randomly assigning pilot sequences to the population of access terminals.

In one embodiment, the population of access terminals communicate with a plurality of access points based on time division duplex protocols.

These and other advantages of the invention will be apparent to those of ordinary skill in the art by reference to the following detailed description and the accompanying drawings.

DETAILED DESCRIPTION

Figure 1:
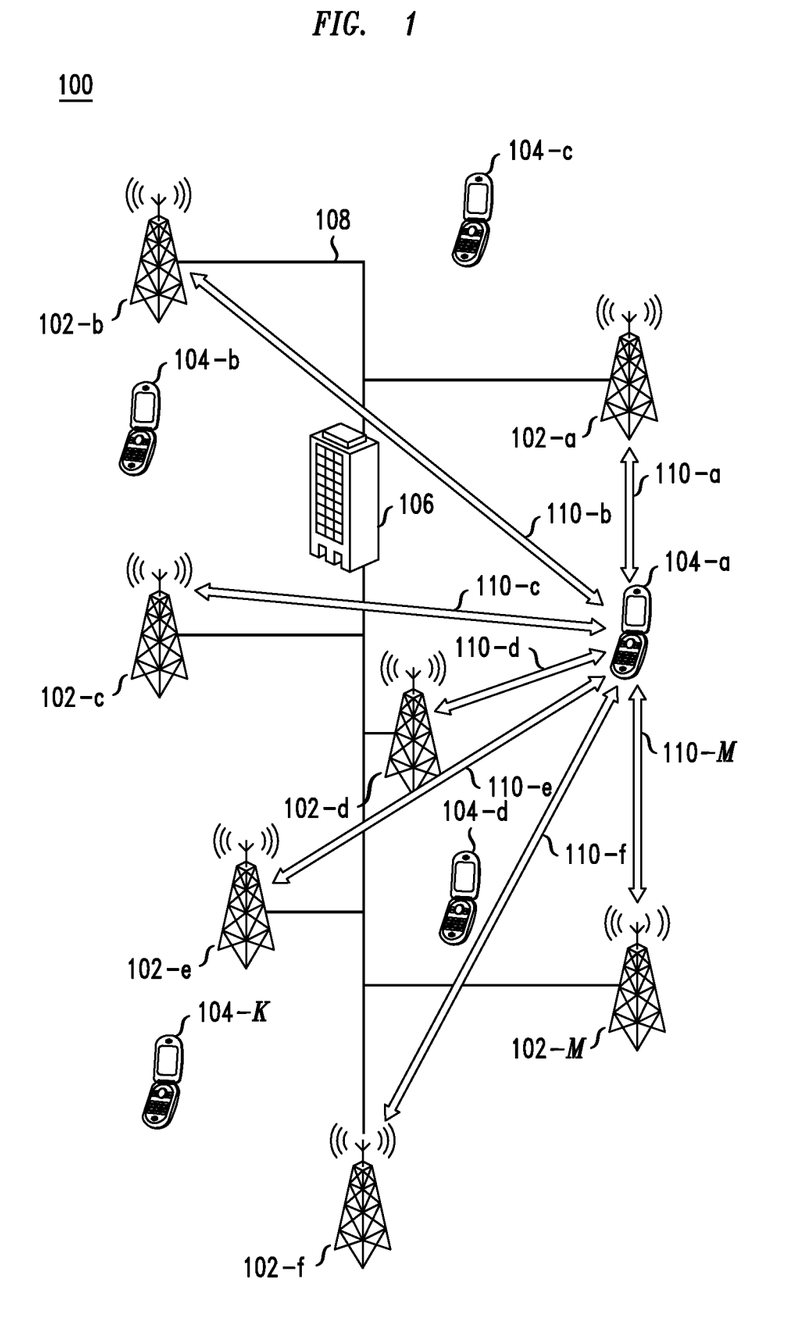
FIG. 1 shows a high-level overview of a distributed cell-free wireless communications system.

FIG. 1 shows a high-level overview of a distributed cell-free wireless communications system 100, in accordance with one or more embodiments. Communications system 100 includes a select population of M service antennas or access points 102-a, 102-b, 102-c, 102-d, 102-e, 102-f, . . . , 102-M (collectively referred to as access points 102), which simultaneously serve Kuser access terminals 104-a, 104-b, 104-c, 104-d, . . . , 104-K (collectively referred to as access terminals 104). Access points 102 are connected to each other and to hub node 106 over backhaul network 108. While backhaul network 108 may typically be a fixed, landline network, such as, e.g., a fiber optic network, it should be understood that backhaul network 108 may be any suitable communications network. For example, backhaul network 108 may be a wireless network. In some embodiments, a designated subpopulation of access terminals 104 may also assume the role of access points 102. Access terminals 104 may have capacity reserved for performing in such a dual role.

Each access point 102 and access terminal 104 is equipped with an antenna element and is randomly located over a large geographical area, such as, e.g., a city. Although access points 102 and access terminals 104 are shown, and discussed herein, as comprising a single antenna element, other embodiments are possible in which some or all of the access points 102 include multi-element arrays. It should be understood that the principles discussed herein may be readily extended to such other embodiments.

Communications system 100 may include any number of access points 102 and access terminals 104. However, in one embodiment, the total number M of access points 102 is much larger than the total number K of access terminals 104, such that M>>K>>1. For example, the total number of access points 102 may be larger than the total number of access terminals 104 by a factor of two or more, or even by a factor of ten or more. The minimum distance between access points 102 is preferably greater than one-fourth the operating wavelength so as to avoid strong correlations in the channel coefficients of neighboring access points. The principles discussed herein may be performed without reliance on a cellular structure or cellular boundaries, although the population of access points 102 may have other modes of operation in which it is organized into cells.

As shown in FIG. 1, each access point 102 has a respective propagation channel 110-a, 110-b, 110-c, 110-d, 110-e, 110-f, . . . , 110-M (collectively referred to as propagation channels 110) to access terminal 104-*a* that it serves. While FIG. 1 shows propagation channel 110 between each access point 102 and access terminal 104-*a*, it should be understood that each access point 102 has a propagation channel to each access terminal 104. To simplify the figures, propagation channels between other access points 102 and other access terminals 104 have been omitted for clarity.

In one embodiment, the transmission from access points 102 to access terminals 104 (i.e., downlink transmission) and the transmission from access terminals 104 to access points 102 (i.e., uplink transmission) proceed following time division duplex (TDD) communication protocols. In accordance with TDD communication protocols, the downlink and uplink channels are separated in time but use the same frequencies. By reciprocity then, the channel estimates for each downlink channel may be taken as equal to the estimates for the corresponding uplink channel. Any channel estimate will be valid only within a coherence interval. The coherence interval depends on the fading characteristics of the particular network of interest. In typical mobile networks, the coherence interval is approximately the time for a mobile terminal to travel a distance of one-fourth the operating wavelength.

Figure 2:
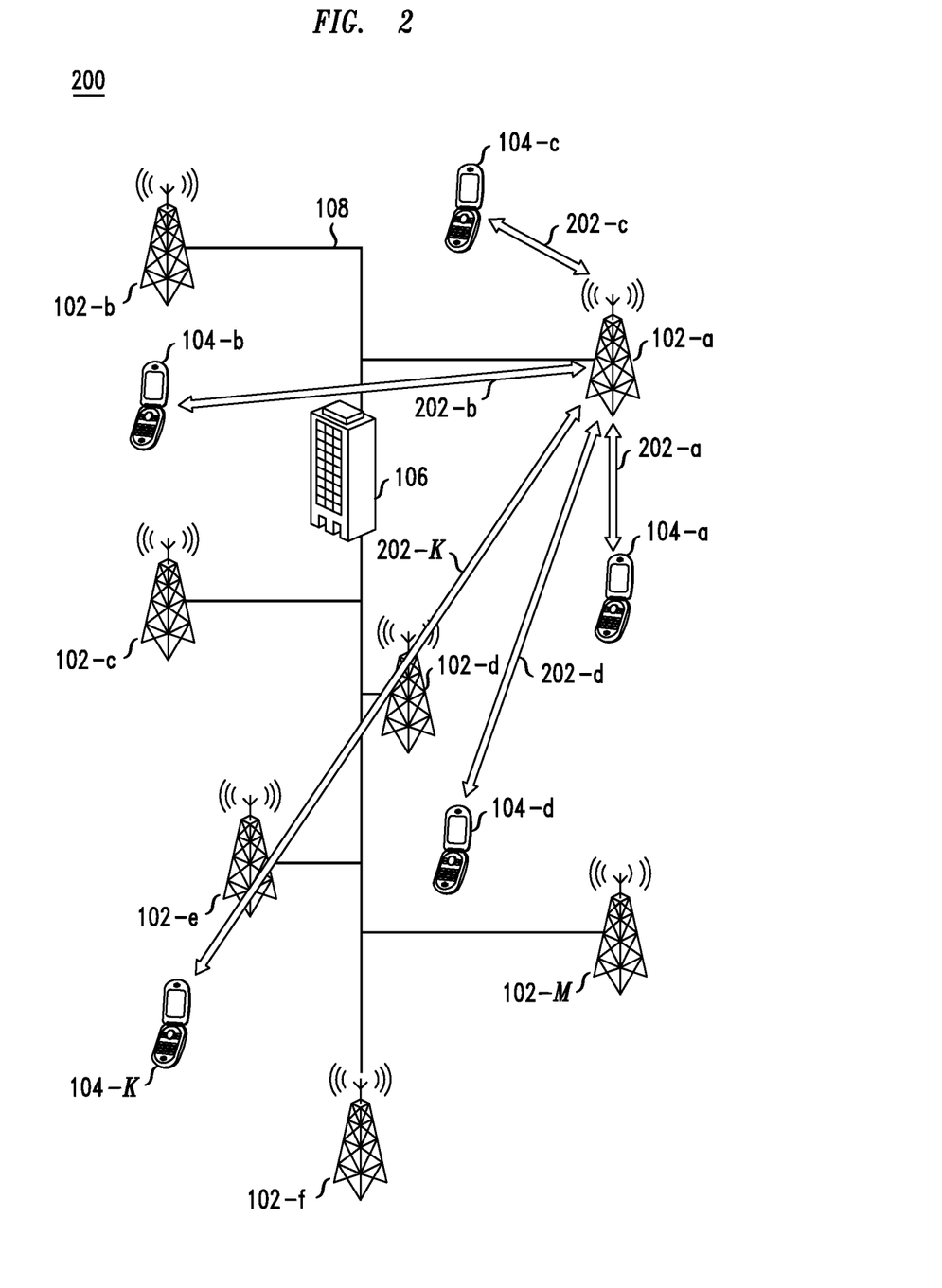
FIG. 2 shows a communications systems operating in accordance with time division duplex communication protocols.

FIG. 2 shows communication system 200 operating in accordance with TDD communication protocols, in accordance with one or more embodiments. All K access terminals 104 in an active subpopulation of access terminals synchronously and simultaneously transmit their uplink signals to all M access points 102 in an active subpopulation of access points over their respective propagation channel 202-*a*, 202-*b*, 202-*c*, 202-*d*, . . . , 202-K (collectively referred to as propagation channels 202). All K access terminals 104 synchronously and simultaneously send pilot sequences $\phi_j$ to all M access points 102 over their respective propagation channel 202, where j=1, . . . , K. Note that some pilot sequences can be reused (i.e., for some j and K, it could be the case that $\phi_j = \phi_k$). The transmission of uplink signals and pilot sequences are shown in FIG. 2, and discussed herein, from access terminals 104 to a selected access point 102-*a*. It should also be understood that each of the access terminals 104 also simultaneously transmit their uplink signals and pilot sequences to all other access points 102.

Accordingly, a complex-valued channel coefficient $g_{ij}$ is defined between each access point 102 and access terminal 104-*a*. Antenna i of access point 102-*a* estimates the channel coefficient $g_{ij}$ to provide estimated channel coefficient $\hat{g}_{ij}$ where j=1, . . . , K. Access point 104-*a* uses the estimated channel coefficient $\hat{g}_{ij}$ to decode the uplink signals that were previously sent by the access terminals 104. Access point 104-*a* also uses the estimated channel coefficient $\hat{g}_{ij}$ to form a signal $x_i$ that comprises the data intended for all K access terminals 104.

Such communication in accordance with TDD communication protocols may be performed using the method described in U.S. patent application Ser. No. 13/238,329, entitled "System and Method of Wireless Communication using Large-Scale Antenna Networks," which is incorporated herein by reference in its entirety.

High throughput in communication system 200 may be achieved due to the estimated channel coefficient $\hat{g}_{ij}$. The best estimated channel coefficient $\hat{g}_{ij}$ can be obtained if the pilots $\phi_j$ are orthogonal (i.e., $\phi_j^* \phi_k = 0$). However, when the number of K access terminals 104 is large, orthogonal pilots $\phi_j$ are not able to be used. Specifically, as the number of access terminals increases, the length of the pilot sequences would have to increase to maintain orthogonality (i.e., pilot sequences would consist of at least K elements each). In other words, the pilots would be t-tuples, with t≥K. Therefore, if K is large, the time required for long pilot sequences may be too long due to the limited length of the coherence interval. Thus, where the number of K access terminals is large, short, non-orthogonal pilots are assigned to the access terminals 104. With high probability, two access terminals that are in close vicinity of each other will use the same pilot sequence. As a result, the performance of these access terminals will suffer due to high pilot contamination.

Figure 3:
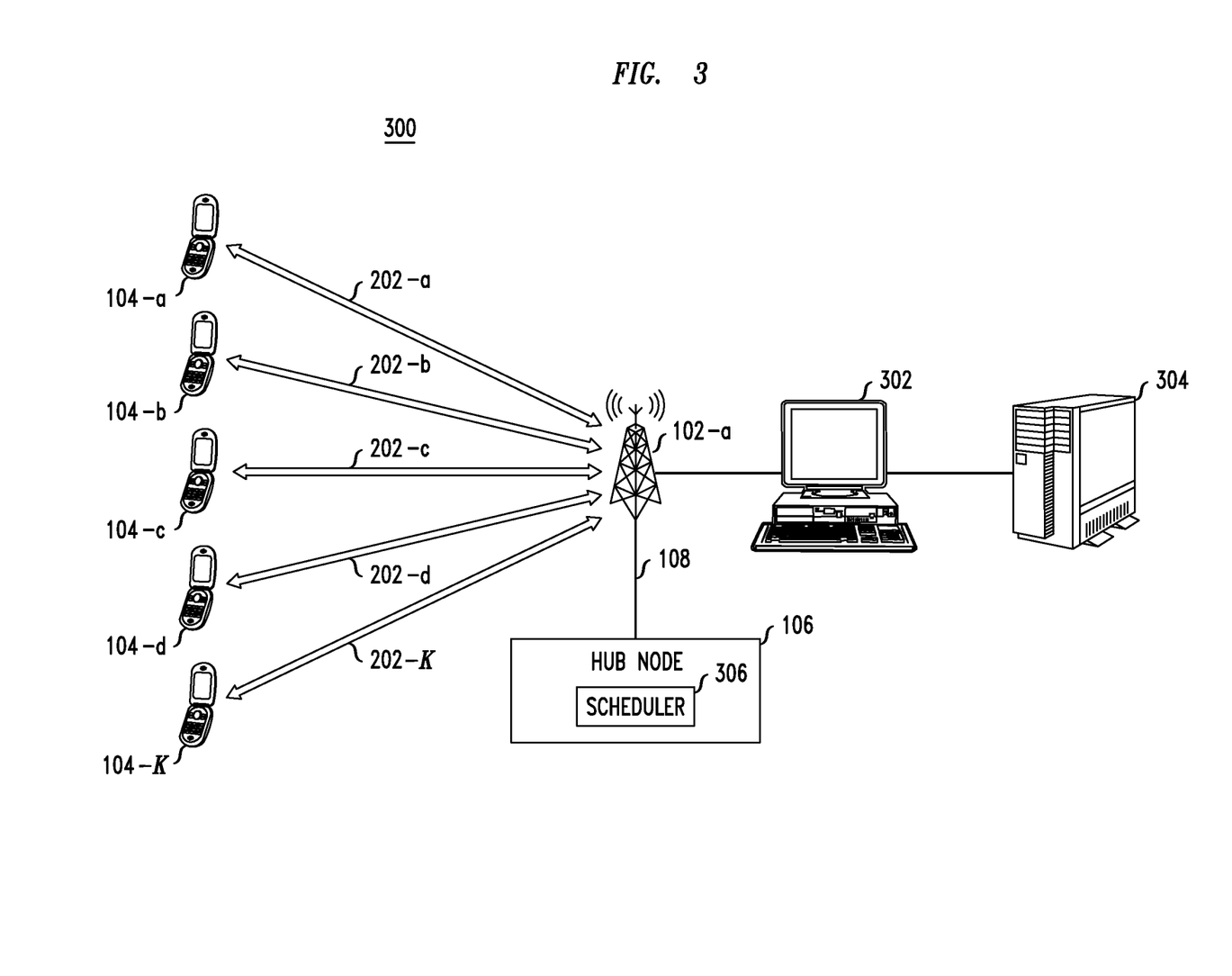
FIG. 3 shows a system for assigning pilots to a population of access terminals.

FIG. 3 shows a system 300 for assigning pilots, in accordance with one or more embodiments. System 300 assigns pilots that are relatively short and therefore non-orthogonal in accordance with an iterative greedy manner such that a high level of system performance is maintained close to the ideal case where all pilots are orthogonal.

Hub node 106 comprises a scheduler 306 for assigning pilots between access terminals 104 and access point 102-*a* in a greedy iterative manner. It should be understood that scheduler 306 in hub node 106 may also assign pilots between access terminals 104 and other access points 102. For a select active subpopulation of access terminals 104, scheduler 306 assigns pilot sequences to each access terminal 104. Preferably, the pilot sequences are assigned randomly to each access terminal 104. In one embodiment, at least some of the randomly assigned pilot sequences are non-orthogonal. Identifying indices of the randomly assigned pilot sequences are forwarded to access point 102-*a* via backhaul network 108. Access point 102-*a* transmits the identifying indices to access terminals 104.

Scheduler 306 evaluates the performance of the access terminals 104 using the randomly assigned pilot sequences. For example, in one embodiment, the performance of access terminals 104 may be based upon its pilot contamination measured using a signal-to-noise ratio (SNR). In another embodiment, the performance of access terminals 104 may be based upon its pilot contamination evaluated from a calculated SNR. Scheduler 306 identifies a worst performing access terminal (e.g., an access terminal with a lowest SNR) and assigns to it a different pilot sequence that improves performance of the worst performing access terminal. Indices identifying the updated assignment of pilot sequences are transmitted to access point 102-*a* and access terminals 104 and the performance of access terminals 104 are again evaluated. In one embodiment, scheduler 306 iteratively determines a worst performing access terminal and assigns to it a different pilot sequence that improves its performance. The worst performing access terminal at each iteration may be the same or different access terminal from the previous iteration. The pilot sequences of the worst performing access terminals are iteratively updated with a pilot sequence that improves its performance until one or more criteria are satisfied. For example, the one or more criteria may be that performance of a worst performing access terminal improves by less than a threshold amount. In one embodiment, the threshold amount may include no improvement in the performance of the worst performing access terminal.

Scheduler 306 then evaluates the performance of the access terminals 104 and identifies a best performing access terminal. For example, the best performing access terminal may be determined based on its SNR (e.g., an access terminal with a highest SNR). Scheduler 306 assigns to the best performing access terminal a different pilot sequence that reduces its performance.

In one embodiment, scheduler 306 returns to iteratively update pilot sequences of the worst performing access terminals to different pilot sequences that improve their performance until the one or more criteria is satisfied, then updates a pilot sequence of the best performing access terminal to a different pilot sequence that reduces its performance. Scheduler 306 may iteratively repeat this process until, e.g., all access terminals 104 have similar performance (e.g., their SNRs are within a threshold amount of each other) and/or a predetermined number of iterations is reached.

Based on the pilot sequences assigned according to the iterative greedy manner discussed herein, access point 102-a determines estimated channel coefficients $\hat{g}_{ij}$, in accordance with TDD communication protocols as discussed above. Access point 102-a includes a co-located processing device 302 and memory device 304 for storing the estimated channel coefficients $\hat{g}_{ij}$ obtained from the assigned pilot signals.

Advantageously, the iteratively greedy pilot assignment of scheduler 306 assigns pilot sequences between access terminals and access points that results in an improved estimated channel coefficient $\hat{g}_{ij}$. The iteratively greedy pilot assignment has been found to improve performance over existing solutions.

Figure 4:
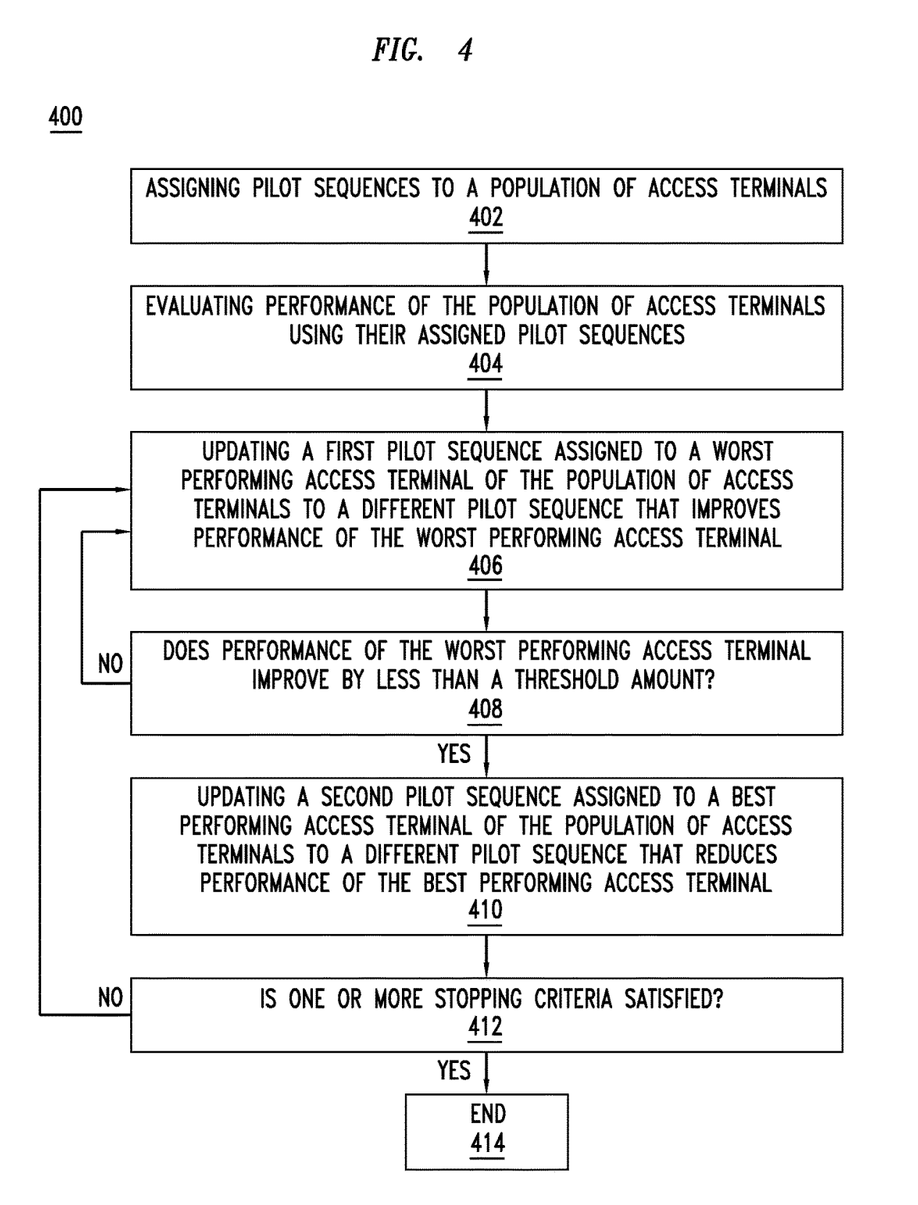
FIG. 4 shows a method for assigning pilots to a population of access terminals.

FIG. 4 shows a method 400 for assigning pilots, in accordance with one or more embodiments. At step 402, pilot sequences are assigned to a select population of access terminals. The pilot sequences may be assigned randomly to the population of access terminals. In one embodiment, at least some of the pilot sequences are non-orthogonal pilot sequences. The population of access terminals may communicate with a plurality of access points based on TDD communication protocols. At step 404, performance of each of the population of access terminals is evaluated using their assigned pilot sequences. The performance of the population of access terminals may be evaluated, e.g., based upon its pilot contamination using the SNR of each access terminal.

At step 406, a first pilot sequence assigned to a worst performing access terminal of the population of access terminals is updated to a different pilot sequence that improves performance of the worst performing access terminal. For example, the worst performing access terminal may be the access terminal with a lowest SNR. At step 408, it is determined whether performance of the worst performing access terminal improved by less than a threshold amount. For example, the threshold amount may include no improvement in the performance of the worst performing access terminal. If performance of the worst performing access terminal does not improve by less than a threshold amount, method 400 returns to step 406. Step 406 is iterated until performance of the worst performing access terminal does improve by less than a threshold amount, and then proceeds to step 410. In one embodiment, steps 406 and 408 may additionally or alternatively be iterated for a predetermined number of iterations.

At step 410, a second pilot sequence assigned to a best performing access terminal of the population of access terminals is updated to a different pilot sequence that reduces performance of the best performing access terminal. For example, the best performing access terminal may be the access terminal with a highest SNR.

At step 412, it is determined whether one or more stopping criteria are satisfied. For example, the one or more stopping criteria may include whether the performance of each of the population of access terminals is within a threshold performance amount of each other. For example, it is determined whether the SNRs of each of the population of access terminals are within a threshold performance amount of each other. The one or more stopping criteria may also include whether the number of iterations (of steps 406-412) satisfies a predetermined number of iterations. Other stopping criteria are also contemplated. In one embodiment, if the one or more stopping criteria are not satisfied, method 400 returns to step 406 and steps 406, 408, 410, and 412 are iterated until the one or more stopping criteria are satisfied. Once the one or more stopping criteria are satisfied, method 400 ends at step 414. In some embodiments, method 400 may repeat for a new select population of access terminals.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
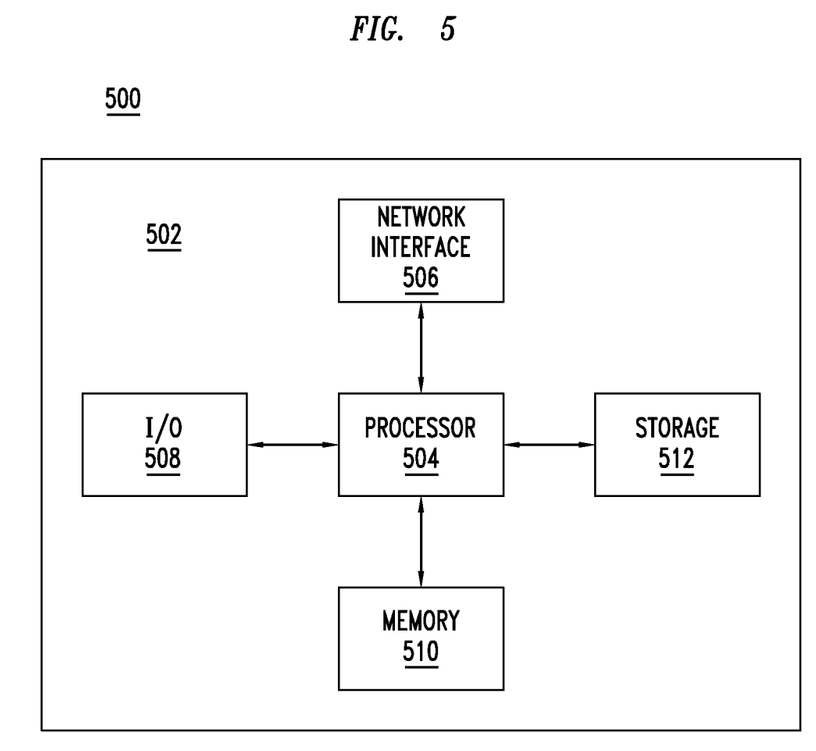
FIG. 5 shows a high-level block diagram of a computer for assigning pilots to a population of access terminals.

A high-level block diagram 500 of an example computer that may be used to implement systems, apparatus, and methods described herein is depicted in FIG. 5. Computer 502 includes a processor 504 operatively coupled to a data storage device 512 and a memory 510. Processor 504 controls the overall operation of computer 502 by executing computer program instructions that define such operations. The computer program instructions may be stored in data storage device 512, or other computer readable medium, and loaded into memory 510 when execution of the computer program instructions is desired. Thus, the method steps of FIG. 4 can be defined by the computer program instructions stored in memory 510 and/or data storage device 512 and controlled by processor 504 executing the computer program instructions. For example, the computer program instructions can be implemented as computer executable code programmed by one skilled in the art to perform the method steps of FIG. 4. Accordingly, by executing the computer program instructions, the processor 504 executes the method steps of FIG. 4. Computer 502 may also include one or more network interfaces 506 for communicating with other devices via a network. Computer 502 may also include one or more input/output devices 508 that enable user interaction with computer 502 (e.g., display, keyboard, mouse, speakers, buttons, etc.).

Processor 504 may include both general and special purpose microprocessors, and may be the sole processor or one of multiple processors of computer 502. Processor 504 may include one or more central processing units (CPUs), for example. Processor 504, data storage device 512, and/or memory 510 may include, be supplemented by, or incorporated in, one or more application-specific integrated circuits (ASICs) and/or one or more field programmable gate arrays (FPGAs).

Data storage device 512 and memory 510 each include a tangible non-transitory computer readable storage medium. Data storage device 512, and memory 510, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 508 may include peripherals, such as a printer, scanner, display screen, etc. For example, input/output devices 508 may include a display device such as a cathode ray tube (CRT) or liquid crystal display (LCD) monitor for displaying information to the user, a keyboard, and a pointing device such as a mouse or a trackball by which the user can provide input to computer 502.

Any or all of the systems and apparatus discussed herein, including elements of system 100 of FIG. 1, system 200 of FIG. 2, and system 300 of FIG. 3, such as, e.g., scheduler 306 of FIG. 3, may be implemented using one or more computers such as computer 502.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for assigning pilot sequences, comprising:
   assigning pilot sequences to a population of access terminals;
   updating a first pilot sequence assigned to a worst performing access terminal of the population of access terminals to a different pilot sequence that improves performance of the worst performing access terminal; and
   updating a second pilot sequence assigned to a best performing access terminal of the population of access terminals to a different pilot sequence that reduces performance of the best performing access terminal.

2. The method as recited in claim 1, wherein the step of updating the first pilot sequence assigned to the worst performing access terminal is performed iteratively until one or more criteria are satisfied.

3. The method as recited in claim 2, wherein the one or more criteria comprises:
   performance of the worst performing access terminal improves by less than a threshold amount.

4. The method as recited in claim 1, wherein the step of updating the first pilot sequence assigned to the worst performing access terminal and the step of updating the second pilot sequence assigned to the best performing access terminal are performed iteratively until at least one of:
   performance of each of the population of access terminals is within a threshold performance amount of each other; and
   a predetermined number of iterations is satisfied.

5. The method as recited in claim 1, wherein at least some of the pilot sequences are non-orthogonal.

6. The method as recited in claim 1, wherein performance of the population of access terminals is based on a signal-to-noise ratio of each of the population of access terminals.

7. The method as recited in claim 1, wherein assigning pilot sequences to the population of access terminals comprises randomly assigning pilot sequences to the population of access terminals.

8. The method as recited in claim 1, wherein the population of access terminals communicate with a plurality of access points based on time division duplex protocols.

9. A computer readable medium storing computer program instructions for assigning pilot sequences, which, when executed on a processor, cause the processor to perform operations comprising:

assigning pilot sequences to a population of access terminals;

updating a first pilot sequence assigned to a worst performing access terminal of the population of access terminals to a different pilot sequence that improves performance of the worst performing access terminal; and updating a second pilot sequence assigned to a best performing access terminal of the population of access terminals to a different pilot sequence that reduces performance of the best performing access terminal.

10. The computer readable medium as recited in claim 9, wherein the operation of updating the first pilot sequence assigned to the worst performing access terminal is performed iteratively until one or more criteria are satisfied.

11. The computer readable medium as recited in claim 10, wherein the one or more criteria comprises:

performance of the worst performing access terminal improves by less than a threshold amount.

12. The computer readable medium as recited in claim 9, wherein the operation of updating the first pilot sequence assigned to the worst performing access terminal and the operation of updating the second pilot sequence assigned to the best performing access terminal are performed iteratively until at least one of:

performance of each of the population of access terminals is within a threshold performance amount of each other; and a predetermined number of iterations is satisfied.

13. The computer readable medium as recited in claim 9, wherein at least some of the pilot sequences are non-orthogonal.

14. The computer readable medium as recited in claim 9, wherein performance of the population of access terminals is based on a signal-to-noise ratio of each of the population of access terminals.

15. The computer readable medium as recited in claim 9, wherein assigning pilot sequences to the population of access terminals comprises randomly assigning pilot sequences to the population of access terminals.

16. An apparatus for assigning pilot sequences, comprising:

a processor; and a memory to store computer program instructions, the computer program instructions when executed on the processor cause the processor to perform operations comprising:

assigning pilot sequences to a population of access terminals;

updating a first pilot sequence assigned to a worst performing access terminal of the population of access terminals to a different pilot sequence that improves performance of the worst performing access terminal; and updating a second pilot sequence assigned to a best performing access terminal of the population of access terminals to a different pilot sequence that reduces performance of the best performing access terminal.

17. The apparatus as recited in claim 16, wherein the operation of updating the first pilot sequence assigned to the worst performing access terminal is performed iteratively until one or more criteria are satisfied.

18. The apparatus as recited in claim 16, wherein the operation of updating the first pilot sequence assigned to the worst performing access terminal and the operation of updating the second pilot sequence assigned to the best performing access terminal are performed iteratively until at least one of:

performance of each of the population of access terminals is within a threshold performance amount of each other; and a predetermined number of iterations is satisfied.

19. The apparatus as recited in claim 16, wherein at least some of the pilot sequences are non-orthogonal.

20. The apparatus as recited in claim 16, wherein performance of the population of access terminals is based on a signal-to-noise ratio of each of the population of access terminals.

\* \* \* \* \*